United States Patent
Brew et al.

(10) Patent No.: US 6,803,087 B2
(45) Date of Patent: Oct. 12, 2004

(54) CERAMIC HONEYCOMB BODY AND PROCESS FOR MANUFACTURE

(75) Inventors: Thomas W. Brew, Corning, NY (US); Mark L. Humphrey, Corning, NY (US); Weiguo Miao, Corning, NY (US); David R. Treacy, Jr., Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/776,829

(22) Filed: Feb. 11, 2004

(65) Prior Publication Data

US 2004/0161583 A1 Aug. 19, 2004

Related U.S. Application Data

(60) Provisional application No. 60/447,973, filed on Feb. 18, 2003.

(51) Int. Cl.$^7$ ................................................. B32B 3/12
(52) U.S. Cl. ...................... 428/116; 428/34.4; 428/188; 422/177; 422/180; 422/211; 422/222; 55/523; 29/592; 29/428; 29/896.6; 425/467; 425/190; 425/461; 425/376.1; 425/380; 425/382 R; 425/464
(58) Field of Search ................................ 428/116, 117, 428/118, 34.1, 34.4, 188; 422/177, 180, 211, 222; 55/523; 29/529, 428, 896.6; 425/467, 190, 461, 376.1, 380, 382 R, 464

(56) References Cited

U.S. PATENT DOCUMENTS 4,168,944 A    9/1979  Morikawa et al.
4,233,351 A   11/1980  Okumura et al.
4,335,023 A *  6/1982  Dettling et al. ............. 502/262
5,714,228 A    2/1998  Beckmeyer et al.
5,952,079 A    9/1999  Andou et al.
6,060,148 A    5/2000  Matsubara et al.
6,159,431 A   12/2000  Inoue et al.
6,287,103 B1   9/2001  Miyazaki
6,656,564 B2  12/2003  Ichikawa et al.

FOREIGN PATENT DOCUMENTS

EP       0 294 106      11/1991
JP       62-234552      10/1987

OTHER PUBLICATIONS

Miyazaki et al., U.S. Pub. 2003/0064126, Apr. 3, 2003, "Extrusion Die for Honeycomb Extrusion Molding and Manufacturing Method Therefor".

* cited by examiner

*Primary Examiner*—Deborah Jones
*Assistant Examiner*—Wendy Boss
(74) *Attorney, Agent, or Firm*—Anca C. Gheorghiu (57) ABSTRACT

There is provided ceramic honeycomb body including a plurality of parallel cells defined by intersecting internal walls, and arranged in horizontal and vertical rows at and between opposing ends of the honeycomb body, an outer peripheral wall surrounding the cells, and further being interconnected to the internal walls, wherein the cells are divided into a first region including a portion of the cells adjacent the outer peripheral wall, and a second region including the remaining cells, wherein the cells in the first region have a wall thickness that is continuously increased along an axis extending to the outer peripheral wall, and, wherein fillets are formed at least at intersections between the interior walls in the first region of cells.

15 Claims, 7 Drawing Sheets

CERAMIC HONEYCOMB BODY AND PROCESS FOR MANUFACTURE

This application claims the benefit of U.S. Provisional Application No. 60/447,973, filed Feb. 18, 2003 entitled "Ceramic Honeycomb Body and Process for Manufacture", by Brew et al.

BACKGROUND OF THE INVENTION

The present invention relates to ceramic honeycomb bodies and process for the manufacture thereof, and in particular to ceramic honeycomb bodies having very thin walls and high surface areas for use for example, in automotive catalytic converters.

Ceramic honeycomb bodies are well known in the automotive industry for their application in the purification of automobile exhaust gas purification. Such structures are at the basis of the catalytic converter system, acting as support substrates to catalysts.

More and more automobile manufacturers are now demanding improved conversion efficiency and faster light-off to meet new engine designs and stricter regulations. These requirements having recently translated into honeycomb structures with very thin walls ($\leq 0.10$ mm) and extremely high geometric surface areas (600–900 cells/in$^2$). However, such design features although beneficial in terms of emissions performance, are not without tradeoffs.

Specifically, very thin wall/high surface area honeycomb structures have low isostatic strength. As a result during the canning process, a required step prior to use in a catalytic converter system, the honeycomb structure is prone to suffer cracking and chipping which has been observed to ultimately lead to catastrophic failure.

Attempts have been made to address this problem. However, approaches suggested have created additional disadvantages, such as a decrease in the thermal shock resistance and an increase in the pressure drop, both of which are critical to good product performance.

Therefore, there remains a need for a ceramic honeycomb body which provides a optimal combination of increased isostatic strength, high thermal shock resistance, and minimum increase in pressure drop for use in automotive exhaust gas purification.

SUMMARY OF THE INVENTION

The present invention relates to honeycombs of improved configurations that offer a significant increase in isostatic strength to resist cracking and chipping damage during handling and canning. At the same time, the bodies of the invention retain favorable thermal shock resistance, and promise resistance to an increase in pressure drop at least equivalent to currently available very thin wall/high surface area honeycomb structures absent the design features of the inventive honeycombs. For purposes of the present invention "currently available very thin wall/high surface area honeycomb structures" shall be referred to in the description of the invention as "standard thin wall honeycombs".

In particular, the invention provides a honeycomb including a plurality of parallel cells defined by intersecting internal walls, and arranged in horizontal and vertical rows at and between opposing ends of the honeycomb body, an outer peripheral wall surrounding the cells, and further being interconnected to the internal walls, wherein the cells are divided into a first region including a portion of the cells adjacent the outer peripheral wall, and a second region including the remaining cells, wherein the cells in the first region have a wall thickness that is continuously increased along an axis extending to the outer peripheral wall, wherein fillets are formed at least at intersections between the interior walls in the first region of cells, fillets having radii which are continuously increased along an axis extending to the outer peripheral wall. Therefore, in the present invention both the wall thickness and the fillet radius are gradually increased towards the outer periphery of the honeycomb to increase isostatic strength while maintaining a high thermal shock resistance.

An extrusion die for fabricating the honeycomb article according to the present invention is provided with a die body including an inlet face, a discharge face opposite the inlet face, a plurality of feed holes extending from the inlet face into the die body, an intersecting array of discharge slots extending into the die body from the discharge face to connect the feed holes at feed hole/slot intersections within the die, the slots being formed by a plurality of pins, wherein a plurality of discharge slots near an outer periphery of the die have a width that is continuously increased along an axis extending to the outer periphery of the die, wherein a plurality of pins near the outer periphery of the die have rounded corners.

In the method of making the extrusion die there is first provided a die body incorporating an inlet face, a discharge face opposite the inlet face, a plurality of feed holes extending from the inlet face into the body, and an intersecting array of discharge slots extending into the body from the discharge face to connect with the feed holes at feed hole intersection within the die, the intersecting array of discharge slots being formed by side surface of an array of pins. Next, there is provided an electrical discharge electrode which includes a plurality of openings formed by a network of intersecting webs having a continuously increasing width in an axial direction to an outer periphery of the electrode, and rounded corners.

Then, the electrical discharge electrode is brought into contact with a plurality of pins on the discharge face of the die body to effect a reduction of pins located in a region adjacent an outer periphery of the die, the reduction being symmetrically on all side surfaces of the pins, concurrently with rounding of the pin corners thereof. As such the resulting die comprises an array of pins wherein a plurality thereof have rounded corners and form discharge slots having a width that is continuously increased along an axis extending to the outer periphery of the die, with the remaining pins being un-machined by the electrical discharge electrode.

BRIEF DESCRIPTION OF THE DRAWINGS

The invention may be further understood by reference to the following drawings, wherein.

DETAILED DESCRIPTION OF THE PREFERRED EMBODIMENTS

Figure 1:
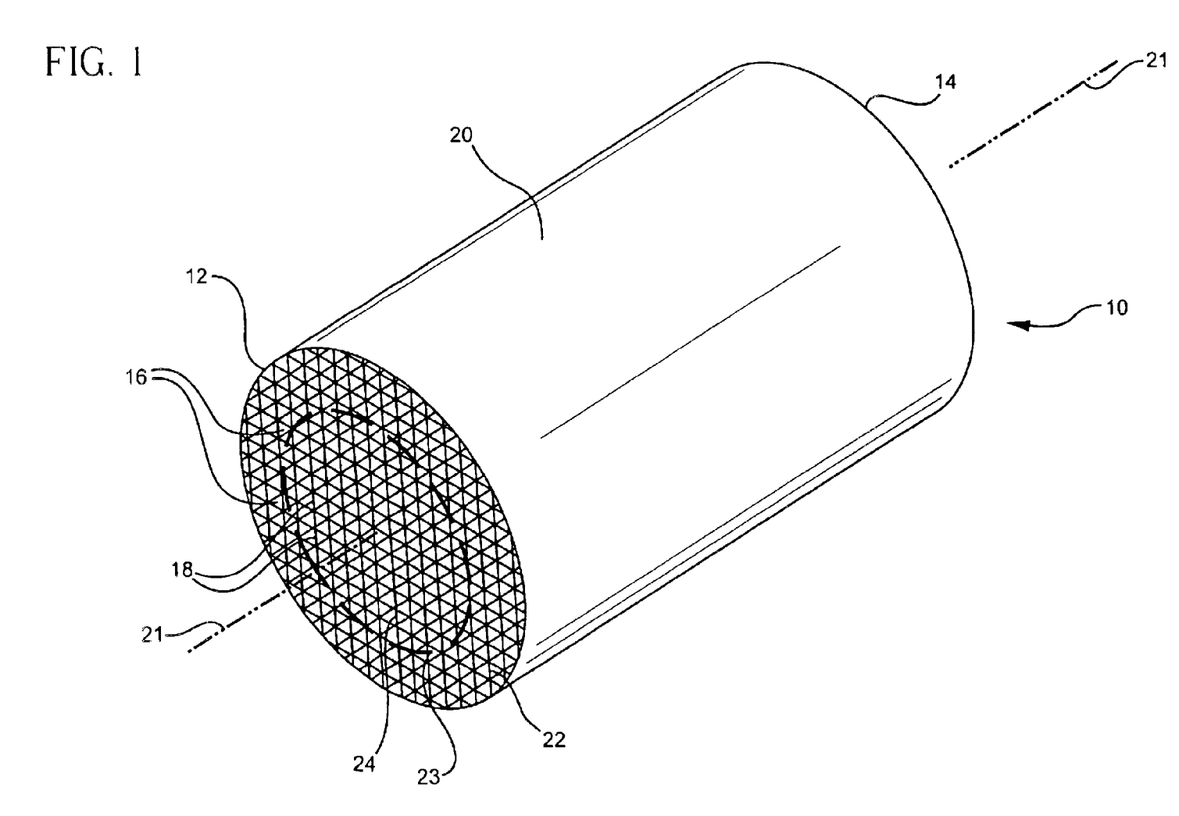
FIG. 1 is a perspective view of a cylindrical honeycomb body showing an inlet end, a plurality of cell channels formed by intersecting interior walls, and an outer peripheral wall.

Referring to FIG. 1 therein illustrated is a perspective view of a honeycomb body 10 having a front or inlet end 12, and an back or outlet end 14 opposite inlet end 12. A plurality of cells 16 extend between inlet end 12 and outlet end 14. The cells are formed by interior walls 18, which run substantially longitudinal and mutually parallel between inlet end 12 and outlet end 14 of honeycomb body 10. An outer peripheral wall 20 surrounds the cells 16 and interior walls 18. Outer peripheral wall 20 also forms what is known in the industry as "skin". In phantom at 23 is drawn an illustrative example of how cells 16 would be suitably divided into first region 22 and a second region 24. Specifically, first region 22 comprises the cells adjacent the outer peripheral wall 20, and a second region 24 comprises the remaining cells 16 near the center axis 21. First region 22 comprises at least twenty rows adjacent outer peripheral wall 20, preferably at least 10 rows, more preferably at least seven rows, and most preferably at least four rows.

Figure 2:
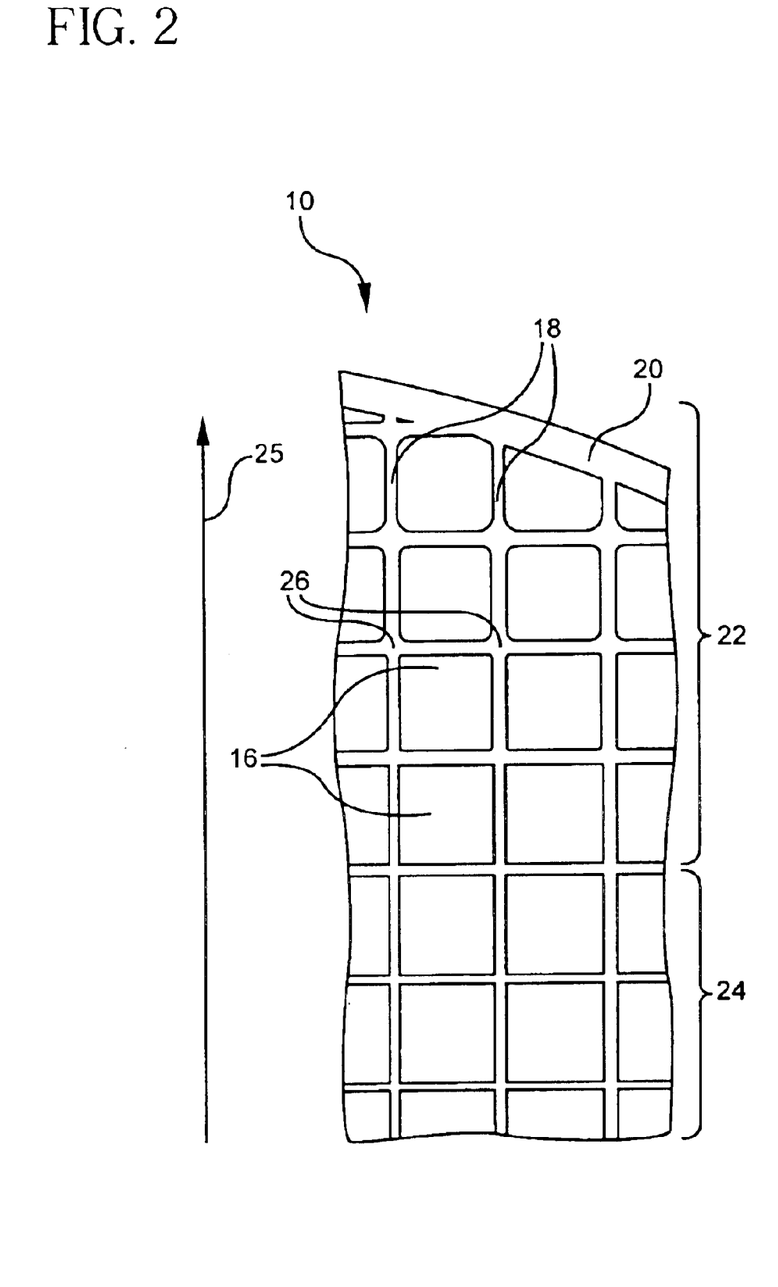
FIG. 2 is a schematic enlarged top view of the honeycomb body of FIG. 1, illustrating cells from the first region with continuously increasing wall thickness along an axis to the outer peripheral wall, and fillets at intersections between internal walls.

Referring to FIG. 2 therein illustrated is a schematic enlarged top view of a portion of inlet end 12 of FIG. 1 which better shows the structure of the inventive honeycombs. Cells 16 in the first region 22 have a wall thickness which is continuously increased along an axis extending to the outer peripheral wall 20 as indicated by arrow 25, such that interior walls 18 are thicker near the outer peripheral wall 20 than at the center axis 21 of honeycomb body 10. Although applicable to honeycomb bodies having varied cell wall thicknesses, the present invention is most suitable for wall thicknesses of $\leq 0.15$ mm, preferably $\leq 0.10$ mm. The wall thickness of cells in first region 22 is varied to be 1.01 to 4 times the wall thickness of cells in the second region 24, along axis 25.

Fillets 26 are formed in the cells of first region 22 at least at junctions or intersections between interior walls 18. Fillets may also be formed at junction of interior walls with the outer peripheral wall, although it is neither necessary nor preferred to include such fillets thereat. It is noted that although all cells 16 in the first region 22 have fillets 26, fillets closer to the outer peripheral wall have a radius that is greater than the radius of fillets close to the center axis 21 of the honeycomb. Accordingly, fillets 26 have a radius which is continuously increased along an axis extending to the outer peripheral wall 20. Specifically, the radius of fillets 26 is within a range of 0.025–0.400 mm. The fillets can have a convex shape or a concave shape, or a combination thereof. In FIG. 2 fillets 26 are shown with a concave shape.

It has been found that the combination of thickening cell walls and fillets in cell rows near the outer peripheral walls provides increased isostatic strength without a detrimental effect on the thermal shock resistance, and also a minimum effect on the pressure drop. Table I presents data relating to isostatic strength for various fillet radii (in mm). MIF or mechanical integrity factor was calculated according to the following equation:

$$MIF = \frac{t^2}{L(L-t-2R)}$$

where t is the internal wall thickness, L is the diameter of the cell, and R is the absolute value of the fillet radius. In the calculations, t is maintained at 0.07 mm and L at 0.84 mm. R is varied between 0 mm (no filleting) and 0.15 mm. It is clear that even a small amount of fillet enhances strength dramatically. For instance, for a fillet having a radius of 0.05 mm, the improvement in strength (i.e., MIF % improvement) is 15%, whereas for a fillet having a radius of 0.127 mm the improvement in strength is 50%.

Figure 3:
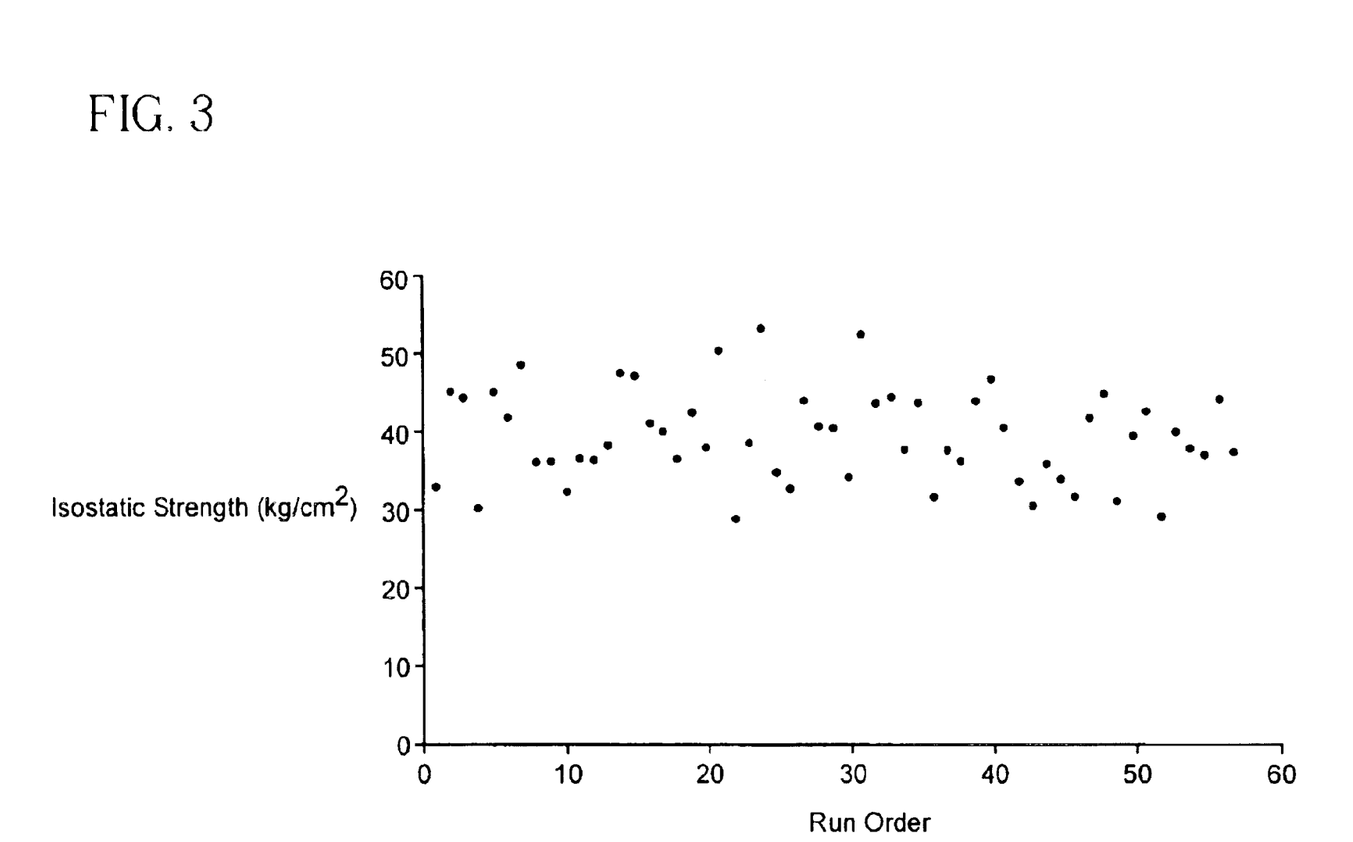
FIG. 3 presents isostatic strength data for ceramic honeycomb bodies according to the present invention.

Referring to FIG. 3 therein illustrated is a graph of isostatic strength data for ceramic honeycomb bodies according to the present invention. Standard thin wall honeycombs absent the design features of the bodies of the present invention have been able to achieve an average isostatic strength of 20 kg/cm². Conversely, a significantly higher average isostatic strength of strength of 38.9 kg/cm² has been observed in the honeycomb bodies of the present invention.

Figure 4:
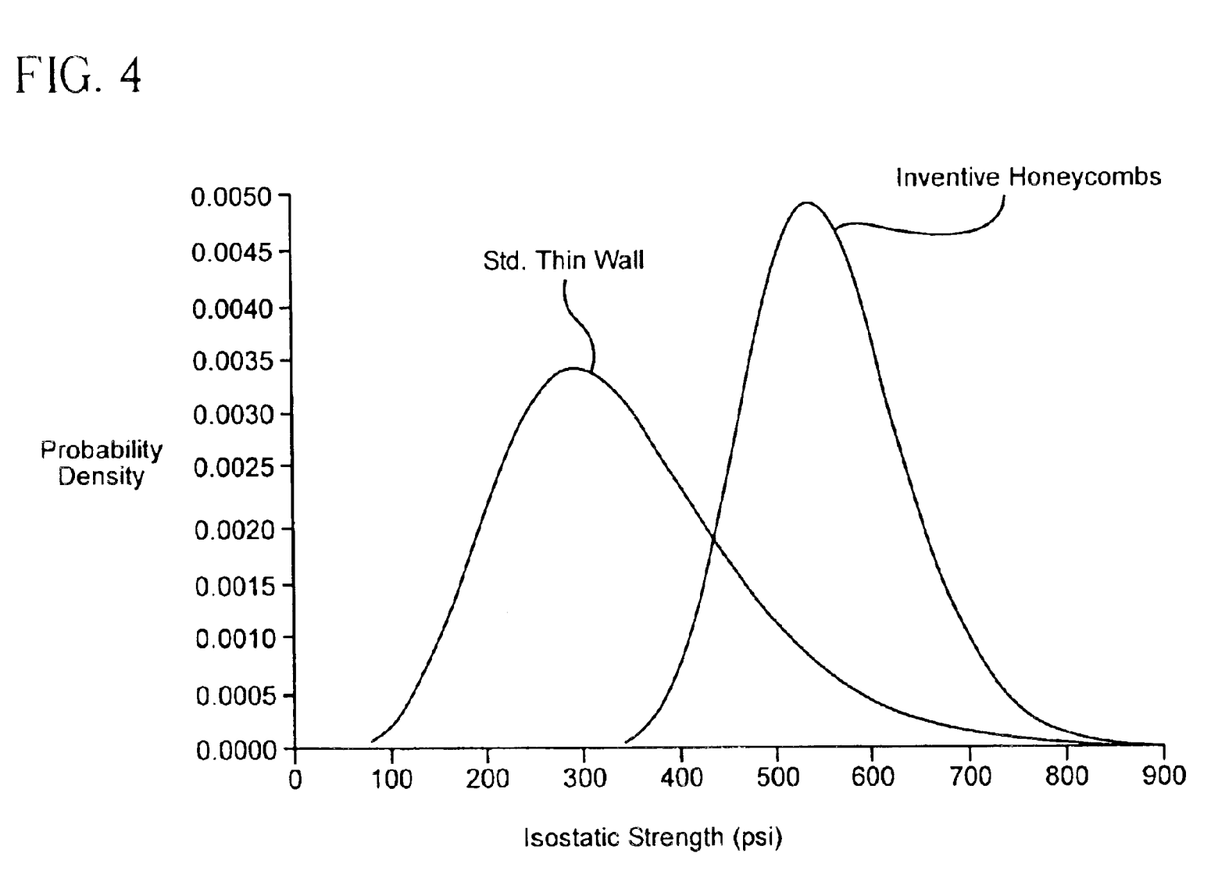
FIG. 4 represents a comparison in isostatic strength between ceramic honeycomb bodies according to the present invention and standard thin wall honeycombs.

Referring to FIG. 4 therein illustrated is a graph presenting a comparison in isostatic strength between inventive honeycomb bodies and standard thin wall honeycombs. As can be seen the inventive honeycomb bodies have on average a higher isostatic strength.

Figure 5:
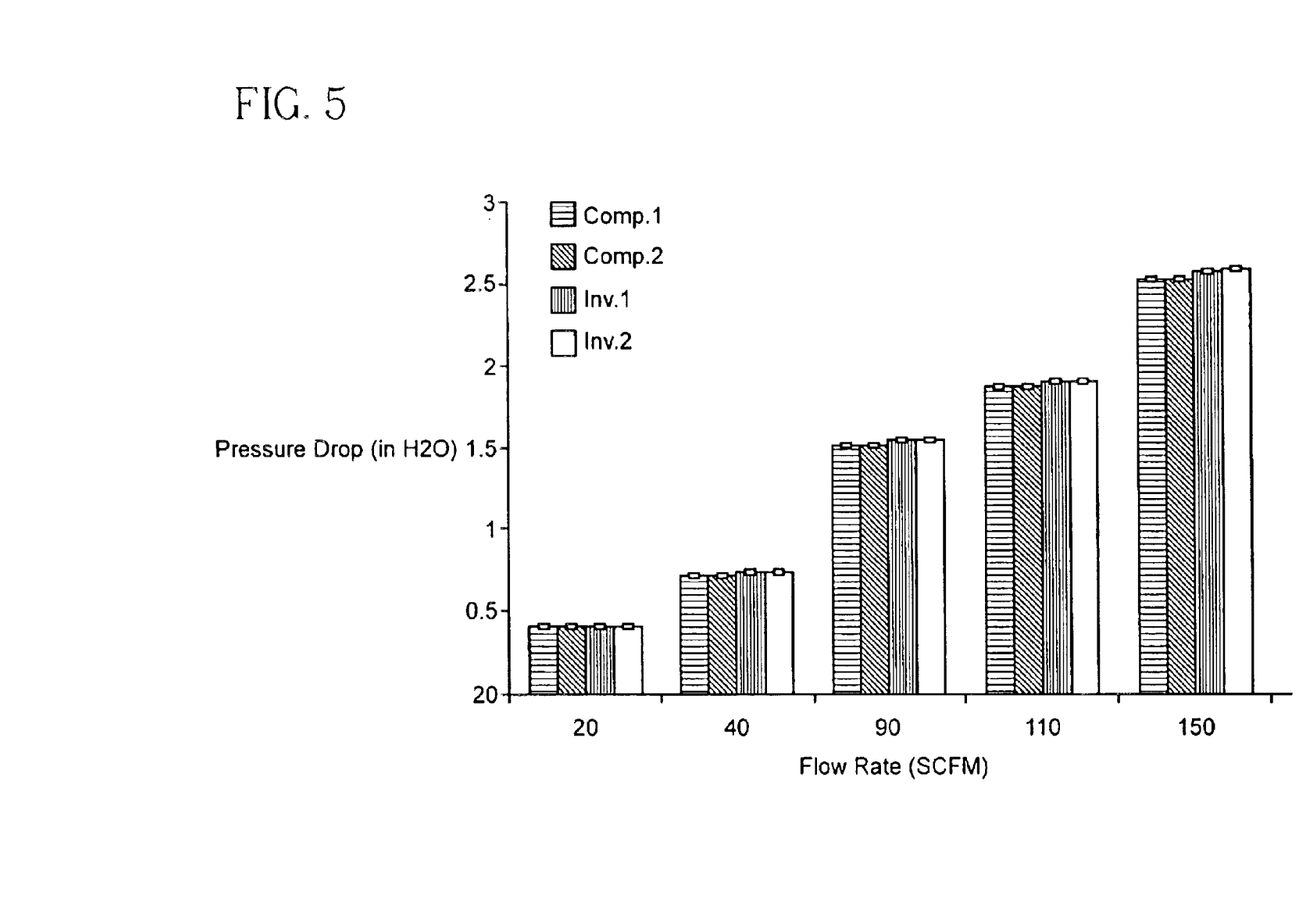
FIG. 5 represents a comparison in pressure drop data between ceramic honeycomb bodies according to the present invention and standard thin wall honeycombs.

In addition to a high isostatic strength, the inventive structures exhibit nearly similar pressured drops when compared to standard thin wall honeycombs, and also high thermal shock resistance. Referring to FIG. 5 therein presented is a comparison in pressure drop for two comparative standard thin wall honeycomb examples (Comp 1, Comp 2) and two inventive honeycomb examples (Inv 1, Inv 2), at various flow rates. The difference in pressure drop between the comparative and inventive examples is on average about 2%. Therefore, the increase in pressure drop in the inventive bodies is maintained at a minimum. The observed average increase of 2% is considered to be virtually undetectable in automotive platform tests.

In addition to high isostatic strength, and low pressure drops, the inventive structures also exhibit high thermal shock resistance. Both oven and cyclic thermal shock tests were performed on samples of cordierite honeycomb bodies in accordance with the present invention. In an oven thermal shock test, according to procedures known in the art, the all parts passed 1000° C. When tested in a cyclic thermal shock test, according to procedures known in the art, all parts passed at 1075° C.

Inventive bodies may be either cylindrical, square, oval, rectangular or any other cross-sectional shape that may be dictated by the particular exhaust system design selected for use. It is further contemplated that the honeycomb bodies comprise a thermally durable ceramic material such as cordierite, silicon carbide, aluminum titanate, and the like. Preferably the honeycomb bodies comprise cordierite. As known in the art, a suitable method for fabricating honeycomb bodies is by forming a plasticized mixture of, for example, coriderite-forming raw materials, which is then extruded through a honeycomb extrusion die into a green structure. Next the green structure is optionally dried, and then fired to a desired temperature for an appropriate amount of time to develop the final ceramic structure.

In the present invention the honeycomb extrusion die is specially fabricated to provide uniquely designed honeycomb bodies as described above. Specifically, a suitable honeycomb extrusion die will have pin arrays comprising a portion of pins with rounded pin corners and gradually widening exit or discharge slots in a direction along an axis extending to the outer periphery of the die.

Conventional extrusion dies for honeycomb production comprise a feed or inlet section, and are provided with a plurality of feedholes for the input of extrudable material to the die, and a discharge section connecting with the feed section for reforming and discharging the extrudable material from a discharge face of the die. As discharged, the material is reformed into a honeycomb shape comprising a plurality of open-ended cells bounded by interconnecting interior walls extending from one end of the structure to another in the direction of extrusion.

The discharge opening in the discharge face of these dies may be configured to form any of a variety of shapes for the interconnecting honeycomb wall structure. Currently, the discharge openings used for the extrusion of commercial ceramic honeycombs for treating automotive exhaust gases are formed by a crisscrossing array of long straight discharge slots of equal spacing. These long slots intersect to form a network of shorter slot segments for the forming of straight wall for square- or triangular-celled honeycombs.

Extrudable material processed through these commercial dies must follow a complex flow path. The material first moves from each feedhole through a transition zone into the base of the slot array, where it flows laterally to join with material from adjacent feedholes. Thereafter, the knitted material is again directed forwardly in the direction of feedhole flow toward the discharge opening formed by the slots, being discharged therefrom in the form of an array of interconnecting interior wall portions forming the cell walls of the honeycomb.

The cross-sectional shapes of the islands or "pins" formed on the discharge faces of these extrusion dies by the intersecting slots segments govern the internal shapes of the channels in the extrudate. Conventional dies do not allow for the formation of thickened and radiused (i.e., filleted) internal cell walls near the periphery of the honeycomb body.

Therefore, in another aspect of the present invention there is provided a die and die fabrication method wherein a honeycomb extrusion die incorporating a discharge face pin array of invariant square or rectangular pin size and shape with equally thick discharge slot widths, is modified by electrical discharge machining (EDM). The EDM method employed, referred to as plunge EDM, involves removing material symmetrically from the side surfaces, and corners of pins in a region near the periphery of the die, using a formed electrical discharge electrode.

A suitable electrical discharge electrode for carrying out the plunge EDM method, can be formed from a copper-tungsten alloy blank using traveling wire electrical discharge machining (wire EDM), as known in the art. Since the invention describes modifying only a portion of a die's pins, the electrode need only encompass that area of the die where these portions of the honeycomb would be formed during extrusion. The area so formed, therefore, includes modification of pins in a region adjacent an outer periphery of the die. Specifically, a plurality of pins in rows extending a portion inward from the outer periphery of the die requiring machining by the electrical discharge electrode.

It is to be noted that conventional extrusion dies are used in the process of the present invention. Specifically, the extrusion die includes a die body incorporating an inlet face, a discharge face opposite the inlet face, a plurality of feedholes extending from the inlet face into the body, and an intersecting array of discharge slots extending into the body from the discharge face to connect with the feed holes at the feed hole/slot intersections within the die, the intersecting array of discharge slots being formed by side surfaces of an array of pins.

Figure 6:
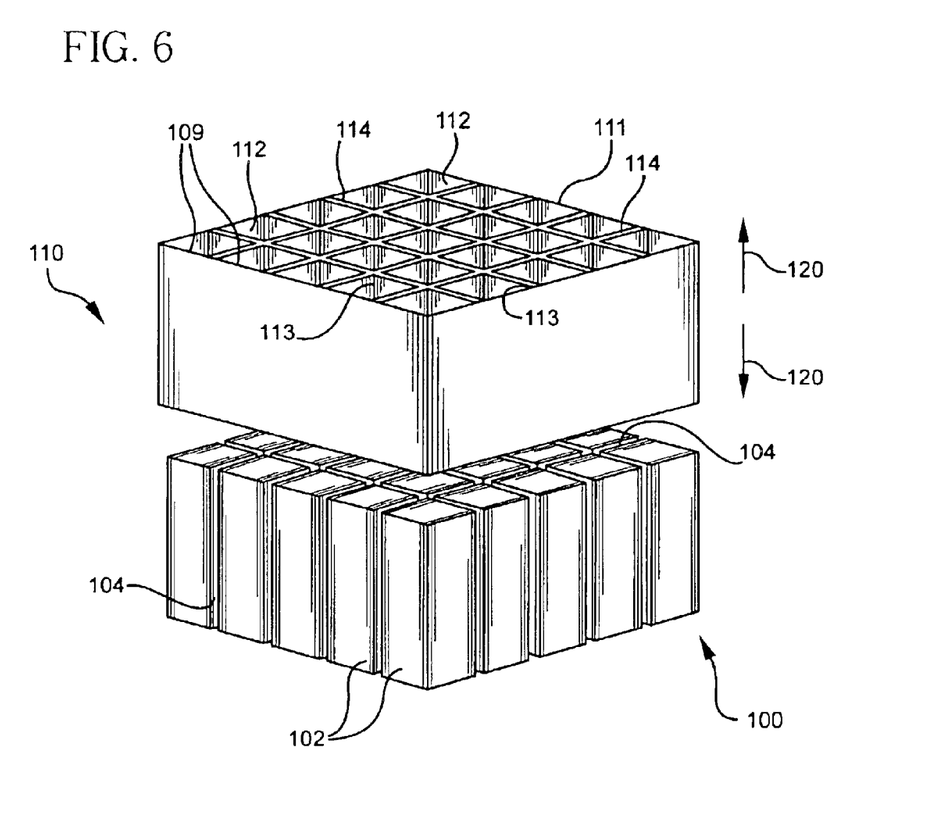
FIG. 6 illustrates the die machining process according to the present invention.

FIG. 6 shows a perspective partial-view of a die 100 and electrode 110 in accordance with the present invention. Die 100 comprises pins 102 and discharge slots 104. Electrode 110 includes openings 112 formed by a network of intersecting webs 114. Webs 114 have a continuously increasing width (not shown) in an axial direction to the outer edge 111 which stands opposite inner edge 109, and rounded corners 113. The shape of electrode 110 is very similar to that of a honeycomb structure, matching the array of pins on the die, so that modification of the pins can be accomplished in groups thereof.

During the plunge EDM process, die 100 is held stationary while electrode 110 is lowered on the array of pins 102. The manner in which electrode 110 moves is indicated by arrow 120. When electrode 110 is lowered into the array of pins 102, the webs 114 being thicker than pre-existing slots 104, remove material symmetrically not only from all side surfaces of pins 102, but also from the corners of pins 102. As a result pre-existing slots 104 are machined to become wider by narrowing surrounding pins 102. The rounded corners 113 of webs 114 radius the corners of pins 102 to create fillets in the extruded honeycomb. Depending on the number of pin rows requiring modification, the size of electrode 110, along with the number of openings 112 and thickness of webs 114 is varied accordingly.

Figure 7:
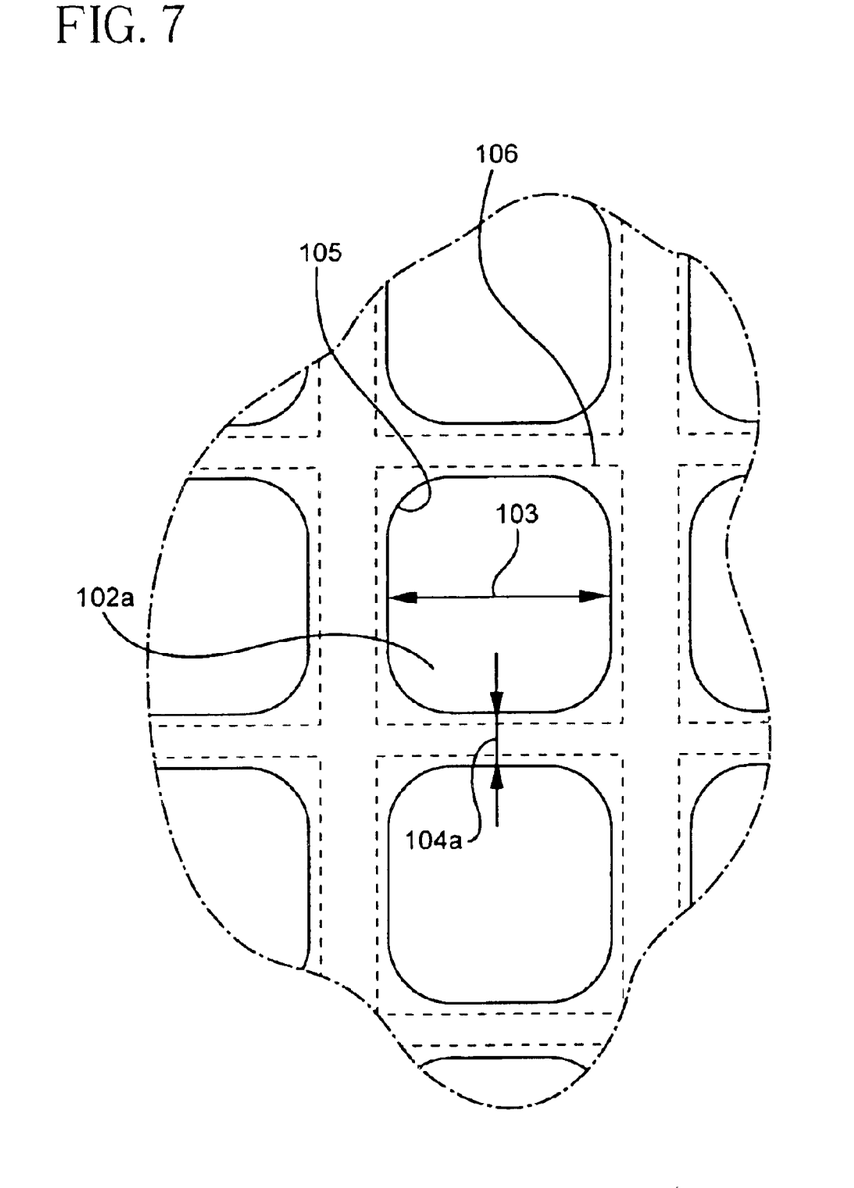
FIG. 7 illustrates a pin array on a discharge face of a die according to the present invention.

To modify pins 102, electrode 110 is used to remove material symmetrically from the sides of the pins thereof. FIG. 7 shows a plurality of pins 102a which have been machined according to the plunge EDM method of the present invention. The original shape and size of the pins are shown in phantom at 106. The modified pins have a smaller diameter 103, and rounded corners 105, which result in narrower pins and wider discharge slots as shown at reference numeral 104a. Discharge slots 104a gradually widen in a direction along an axis extending to the outer periphery of the die.

The pin machining process employed does not alter the inlet or feedhole section of the die in any way, nor is there any change to the inlet section of the die required. The geometry of the extruded honeycomb body produced from a machined die of this design has continuously thickening internal walls and fillets at wall junctions in a region of cells adjacent an outer peripheral wall of the body.

TABLE I

| Fillet radius (mm) | MIF | MIF % improvement |
| --- | --- | --- |
| 0 (no fillet) | 0.007291 | 0 |
| 0.01 | 0.00754 | 3.5 |
| 0.025 | 0.007806 | 7.1 |
| 0.04 | 0.008092 | 11 |
| 0.05 | 0.0084 | 15.2 |
| 0.06 | 0.008732 | 19.8 |
| 0.076 | 0.009091 | 24.7 |
| 0.09 | 0.009481 | 30 |
| 0.10 | 0.009906 | 35.9 |
| 0.114 | 0.010371 | 42.2 |
| 0.12 | 0.010882 | 49.3 |
| 0.14 | 0.011446 | 57 |
| 0.152 | 0.012072 | 65.6 |

What is claimed:

1. A honeycomb comprising:
a plurality of parallel cells defined by intersecting internal walls, and arranged in horizontal and vertical rows at and between opposing ends of the honeycomb body, an outer peripheral wall surrounding the cells, and further being interconnected to the internal walls, wherein the cells are divided into a first region including a portion of the cells adjacent the outer peripheral wall, and a second region including remaining cells, wherein the cells in the first region have a wall thickness that is continuously increased along an axis extending to the outer peripheral wall, and, wherein fillets are formed at least at intersections between the interior walls in the first region of cells, the fillets having a radius, wherein the radius of the fillets is continuously increased along an axis extending to the outer peripheral wall.

2. The honeycomb of claim 1 wherein the first region of cells includes at least twenty rows of cells adjacent the outer peripheral wall.

3. The honeycomb of claim 2 wherein the first region of cells includes at least ten rows of cells adjacent the outer peripheral wall.

4. The honeycomb of claim 3 wherein the first region of cells includes at least seven rows of cells adjacent the outer peripheral wall.

5. The honeycomb of claim 4 wherein the first region of cells includes at least four rows of cells adjacent the outer peripheral wall.

6. The honeycomb of claim 1 wherein the walls of cells in the second region have a thickness of $\leq 0.15$ mm.

7. The honeycomb of claim 6 wherein the walls of cells in the second region have a thickness of $\leq 0.10$ mm.

8. The honeycomb of claim 6 wherein the walls of cells in the first region have a thickness that is 1.01–4 times the wall thickness of the cells in the second region.

9. The honeycomb of claim 1 wherein the fillets have a radius of 0.025–0.400 mm.

10. The honeycomb of claim 1 wherein the fillets in the first region of cells are of the type selected from the group consisting of concave, convex and combinations thereof.

11. The honeycomb of claim 10 wherein the fillets are concave.

12. The honeycomb of claim 10 wherein the fillets are convex.

13. The honeycomb of claim 10 wherein the fillets are both concave and convex.

14. An extrusion die for fabricating the honeycomb of claim 1, the die comprising:

an inlet face;

a discharge face opposite the inlet face;

a plurality of feed holes extending from the inlet face into the die body;

an intersecting array of discharge slots extending into the die body from the discharge face to connect the feed holes at feed hole/slot intersections within the die, the slots being formed by a plurality of pins;

wherein a plurality of discharge slots near an outer periphery of the die have a width that is continuously increased along an axis extending to the outer periphery of the die;

wherein a plurality of pins near the outer periphery of the die have rounded corners.

15. A method of making the honeycomb extrusion die of claim 14, comprising:

providing a die body incorporating an inlet face, a discharge face opposite the inlet face, a plurality of feed holes extending from the inlet face into the body, and an intersecting array of discharge slots extending into the body from the discharge face to connect with the feed holes at feed hole intersection within the die, the intersecting array of discharge slots being formed by side surface of an array of pins;

providing an electrical discharge electrode having a plurality of openings formed by a network of intersecting webs, the intersecting webs having a continuously increasing width in an axial direction to an outer periphery of the electrode, the intersecting webs having rounded corners at intersections thereof;

bringing the electrical discharge electrode into contact with the array of pins on the discharge face of the die body; and, reducing a plurality of pins in a region adjacent an outer periphery of the die, the reducing occurring symmetrically on all side surfaces of the pins, and while concurrently rounding the corners of the pins thereof, by plunge electrical discharge machining, whereby there is formed a die comprising an array of pins wherein a plurality thereof have rounded corners and form discharge slots having a width that is continuously increased along an axis extending to the outer periphery of the die.

* * * * *